United States Patent [19]

Okada et al.

[11] Patent Number: 4,921,175
[45] Date of Patent: May 1, 1990

[54] FOOD PROCESSOR

[75] Inventors: Yoshihisa Okada; Yoshihiro Enya, both of Komaki, Japan

[73] Assignee: Sanyei Corporation, Japan

[21] Appl. No.: 402,220

[22] Filed: Sep. 1, 1989

[51] Int. Cl.[5] .................. A47J 44/00; B02C 18/12; B01F 7/16
[52] U.S. Cl. .................. 241/37.5; 99/510; 99/537; 241/92; 241/282.1; 366/314; 366/601
[58] Field of Search .............. 99/492, 485, 348, 510, 99/537; 366/314, 347, 601; 241/37.5, 36, 92, 199.12, 282.1, 282.2; 83/355, 592, 665, 666; 200/50 A, 5 B

[56] References Cited

U.S. PATENT DOCUMENTS

| | | | |
|---|---|---|---|
| 2,550,895 | 5/1951 | Weismueller | 99/510 |
| 4,240,338 | 12/1980 | McClean | 99/503 |
| 4,448,360 | 5/1984 | Williams | 241/282.1 |
| 4,516,733 | 5/1985 | Funagura et al. | 83/355 |
| 4,542,857 | 9/1985 | Akasaka | 241/92 |
| 4,691,870 | 9/1987 | Fukunaga et al. | 241/37.5 |
| 4,711,167 | 12/1967 | Sano | 99/510 |
| 4,716,823 | 1/1988 | Capdevila | 366/601 |

FOREIGN PATENT DOCUMENTS 2170395 8/1986 United Kingdom ............. 241/37.5

Primary Examiner—Timothy F. Simone
Attorney, Agent, or Firm—Ostrolenk, Faber, Gerb & Soffen

[57] ABSTRACT

A food processor includes a main body with a graspable handle. A base plate is disposed in the main body. The base plate has a peripheral wall for defining a chamber. The peripheral wall has a discharge cutout along one circumferential part. A cover is removably placed over the base plate. A rotary blade supported on a driven shaft projects into the chamber between the cover and the base plate. An electric switch for the electric drive motor to the shaft includes a switch lever that pivots toward the main body to close contacts to the drive motor. A bar normally blocks for pivoting of the switch lever until the cover is placed on the base plate. The cover pushes the bar away from blocking the switch lever for enabling the switch lever to pivot to contact the contacts for activating the drive motor.

9 Claims, 5 Drawing Sheets

FOOD PROCESSOR

BACKGROUND OF THE INVENTION

This invention relates to an electric food processor that slices, minces or grinds vegetables, or other food products, through the rotation of a rotary blade and particularly to a food processor of reduced size.

Electric food processors are comprised of a number of elements. A main case or body receives the driving parts. An electric motor is disposed in the case. A rotary shaft driven by the motor is supported in the case in a rotatable manner. A container or vessel is installed freely detachably on the main case. The food material to be processed is fed into the container or vessel. A rotary blade, which is detachably supported on the rotary shaft, is located inside the container. A cover with a feed opening covers the upper end opening of the container where the rotary blade has been installed. When the food material to be processed is fed into the container through the feed opening in the cover, that food material is cut or chopped to the required size and shape by the rotating rotary blade.

Because an electric food processor having the above structure must accommodate within its container all of the food material that has been processed, it is essential to provide a container having adequate capacity. As a result, the entire conventional food processor has become large to a certain degree, and it has been difficult to reduce its size.

SUMMARY OF THE INVENTION

This invention remedies the above described shortcoming of the conventional food processor. The invention provides an electric food processor which is capable of cutting food material into the required size and shape and which discharges the food, without using a collection container or vessel, thereby reducing the overall size of the food processor.

The food processor of the invention comprises the following elements. There is a handle which is sized to be grasped. There is a main case or body supported by the handle in which a driving shaft is rotatably supported. A driving member like a motor rotatably drives the driving shaft. A rotating blade is detachably connected with the driving shaft. A planar bottom plate is detachably installed in the main body and the driving shaft projects through the bottom plate. The bottom plate has a peripheral wall with a cutout defined in it for enabling food discharge. The cutout extends around a part of the outer wall of the plate. The peripheral wall is of such a height as to at least accommodate the rotary blade. A cover having a discharge opening at a location that approximately corresponds to the location of the cutout in the peripheral wall of the bottom plate is placed at a part of the outer periphery of the cover. The cover has a feed opening. The cover is freely detachable on the bottom plate and covers over the rotary blade and defines a cutting chamber between the cover and the bottom plate. The chamber is about the height and diameter of the blade. A switch member supplies electric power to the driving member, for rotatably driving the rotary blade, but preferably only after the cover has been installed over the bottom plate.

When food material is fed through the feed opening in the cover that is provided over the bottom plate and into the chamber where the rotary blade is accommodated, the food material is cut and prepared to a desired size and shape by the rotating rotary blade and is thereafter discharged rather than being stored. Upon completion of the processing of the food, the cover, the bottom plate and the rotary blade may be dismantled and may be cleaned individually. As a consequence, it is possible to reduce the size of the device. At the same time, it is possible to clean the device quite easily.

Other objects and features of the invention are described below with reference to the drawings.

DESCRIPTION OF A PREFERRED EMBODIMENT

The main case or body 3 of the electric food processor 1 has a handle 3a that is in the shape generally of a square cross-section pillar The handle is integrally formed at its rear part. The handle has a semicylindrical, bottom, plate like part 3b that is integrally formed at its front or tip.

Figure 1:
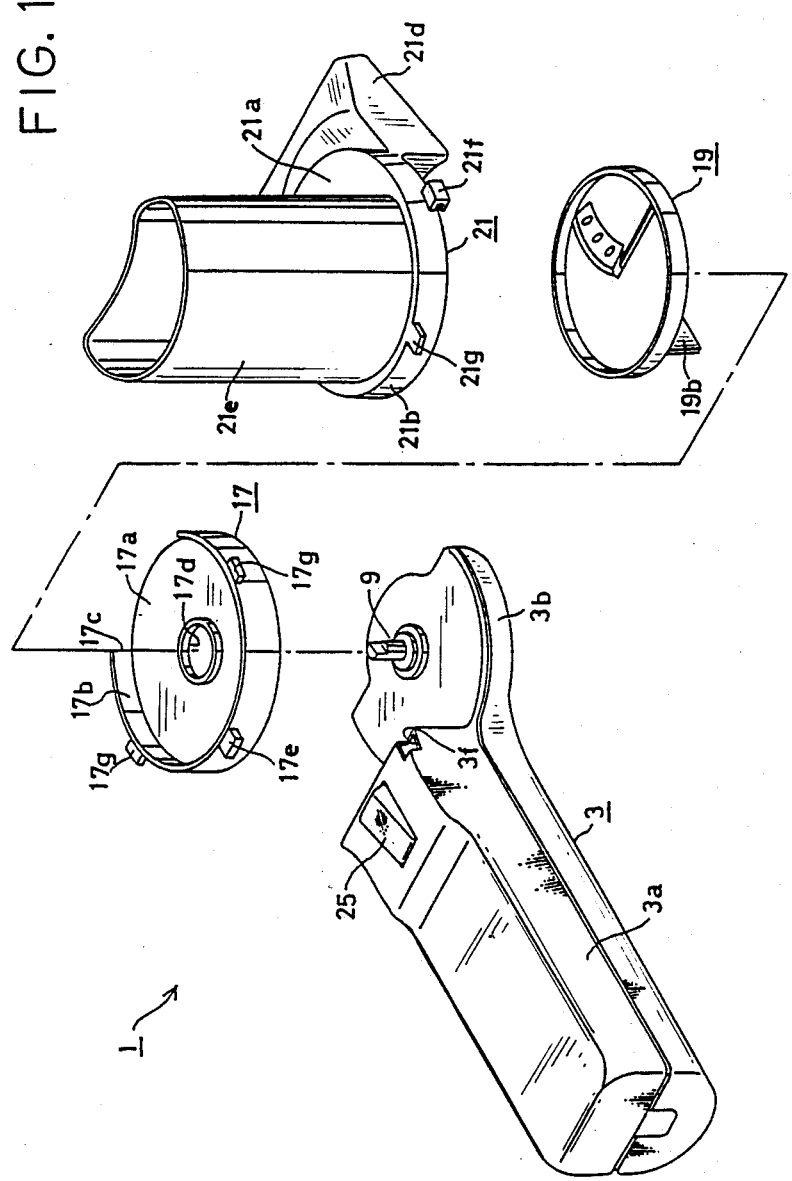
FIG. 1 is a perspective view of a dismantled electric food processor according to the invention.
Figure 2:
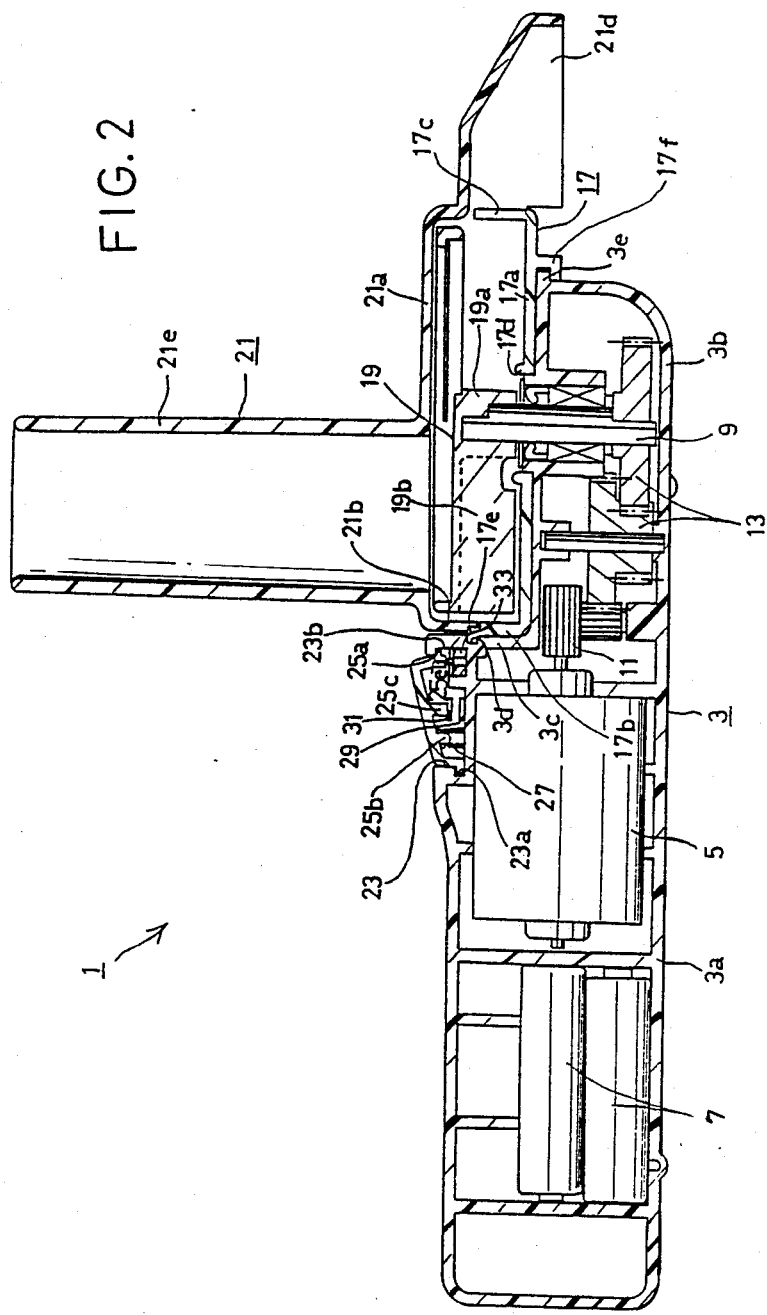
FIG. 2 is a central, vertical, cross sectional view of an assembled electric food processor of the invention.

As shown in FIG. 2, an electric motor 5 serves as the driving member. A cell 7 is the electric battery for driving the electric motor 5. These are accommodated inside the handle 3a.

An upright blade driving shaft 9 is rotatably supported at semicylindrical plate part 3b. The shaft is directed perpendicular to the handle 3a. A series of meshed gear 11 and 13 drivingly connect the driving shaft 9 with the electric motor 5. Driving shaft 9 is rotatably driven at a required speed reduction ratio.

An engaging concave or lip 3d is formed on the erect wall 3c, which is between the handle 3a and the semicylindrical part 3b. At the front of the semicylindrical part 3b, there is an integrally formed engaging protrusion 3e.

Figure 3:
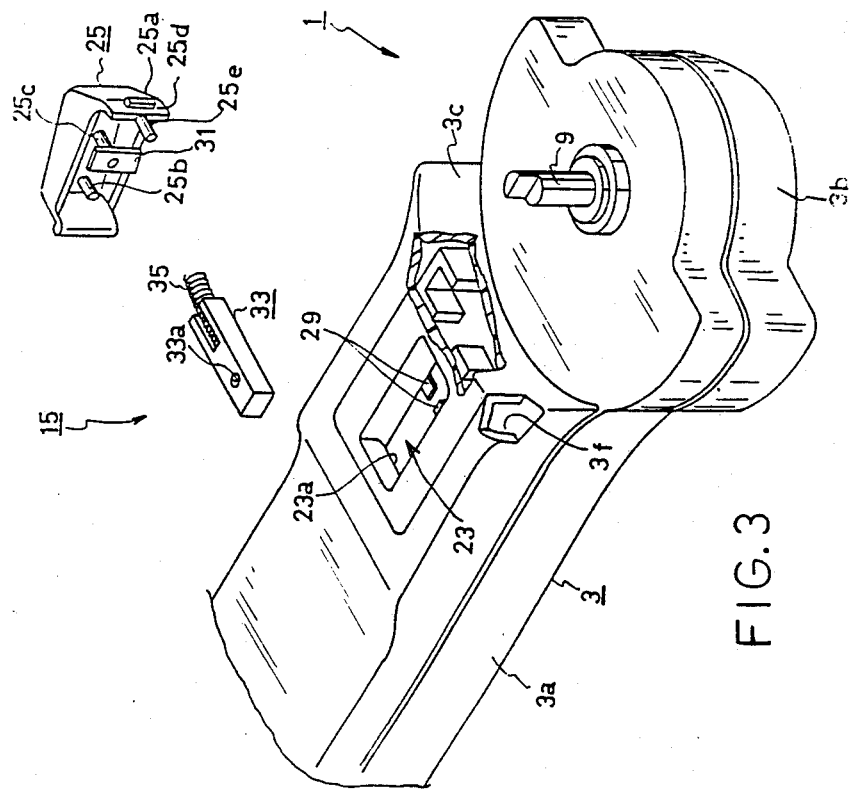
FIG. 3 is a dismantled perspective view of the switch structure of the food processor.

At the top of the front end part of the handle 3a, there is an electric source switch mechanism 15. As shown in FIG. 3, a concave or receptacle 3f is formed on the upper surface of the handle 3a for receiving the switch mechanism 15.

Just above the upper surface of the semicylindrical plate like part 3b, a bottom plate 17 is installed in a freely detachable manner. The bottom plate 17 includes a peripheral support wall 17b that is of a height that is related to the height of the rotary blade 19, described below, for providing rotation clearance for the blade. The wall 17b is integrally formed on the outer peripheral side of the approximately circular, planar bottom plate 17a of the plate 17. An arcuate cutout 17c is formed of a desired circumferential width at a part of the support wall 17b for permitting outlet of cut and processed food.

At the center of the planar plate 17a of the bottom plate 17, a through hole 17d is formed. It is located and is of such size as to permit the passage therethrough of the driving shaft 9.

The support wall 17b includes an integrally formed engaging protrusion 17e that can engage with the engaging concave 3d for joining the plate 17 to the handle 3. On the lower surface of the front end of the planar plate 17a, there is an integrally formed engaging part 17f, with a cross section approximately in the shape of an 'L', which engages the engaging protrusion 3e, again for joining the plate 17 to the handle 3. On the outer periphery of the support wall 17b, there are two integrally formed engaging protrusions 17g at mutually opposite locations.

A rotary blade 19 is detachably installed on the driving shaft 9. The blade is approximately in the shape of a disc. It includes a shaped boss 19a at its underside that is installed over a correspondingly shaped notch toward the top of the driving shaft 9. The boss is integrally formed on the lower surface of the blade 19 and at its center.

On the lower surface of the rotary blade 19, an integrally formed scrape plate 19b extends out from the center of the blade so to approach the upper surface of the planar plate 17a of the bottom plate 17.

A cover 21 is installed freely detachably over the bottom plate 17. On the outer periphery of the plate part 21a of the cover 21, there is an integrally formed downward wall 21b. A cutout is formed in the wall 21b correspondingly located at and shaped to the cutout 17c and located at the front end of the wall 17b.

An integrally formed processed food ejection part 21d extends radially from the cover 21. It includes an opening downwardly at the planar part 21a at a location forward of and corresponding to the cutout in the cover.

Over a partial cylindrical part of the upper surface of the planar part 21a, an integrally formed, upwardly erect cylindrical part 21e is formed. It communicates into the interior of the food processor, and the food material to be processed is fed through the said cylindrical part 21e.

Integrally formed at opposite sides around the outer periphery of the hang-down wall 21b, there are two engageable parts 21f. Their cross sections are approximately U-shaped. They are placed in opposition to the respective protrusions 17g on the plate 17 to lock the cover 21 to the plate 17 when the respective parts 17g and 21f are brought into engagement. At the outer periphery of the hang-down wall 21b, an operating piece 21g is integrally formed in such a manner as to approximately agree with and to extend into the concave 3f of the handle 3.

The electric source switch mechanism is received in the handle 3. An installation recess 23 is formed in the upper surface toward the front part of the handle 3a, and the electric source switch mechanism 15 is installed in it. At the deep recess 23a of the installation recess 23, the base of the movable, and particularly pivotable operating lever 25 is engaged with a step 23b that is formed at the front end of the recess 23 for preventing the lever 25 from being dismantled from the recess 23.

On the bottom of the lever 25, there are an integrally formed support rib 25b and an operating rib 25c. The operating lever 25 is given an upward bias at all times, with the base as its center, by the elasticity of the compression spring 27 that is provided between the support rib 25b and the bottom surface of the recess 23.

Two electrodes 29 are placed on the bottom surface of the installation recess 23. They are spaced apart and are both located below the operating rib 25c. An electrode plate 31 is supported on the lever 25 at a distance spaced above the two electrodes 29, but is contactable with each of the electrodes when the lever is moved down.

A hang-down wall 25d is formed integrally at the front end of the operating lever 25. At its lower end is an integrally formed axial part 25e. Part 25e has the length of an axial line corresponding to the distance between the electrode 29 and the electrode plate 31.

A regulating member 33 is arranged inside the installation recess 23. It cooperates with the axial part 25e. The regulating member 33 is movable so that its front end may be held at the lateral side of the concave 3f at all times. It is held there by the elasticity of a compression spring 35 provided inside the installation recess 23.

A hole 33a is formed in the top of the regulating member 33 of a size to permit the entry of the axial part 25e. When the regulating member 33 is moved to the side of the concave 3f, the hole 33a is positioned misaligned with the axial part 25e to prevent entry of the axial part 25e into the hole 33a. The axial part 25e is positioned to move down into the hole 33a when the regulating member 33 is moved to the opposite side and away from the side of the concave 3f. When the hole 33a is positioned to permit entry of the axial part 25e, the pivoting of the operating lever 25 by operator hand pressure is permitted.

Figure 4:
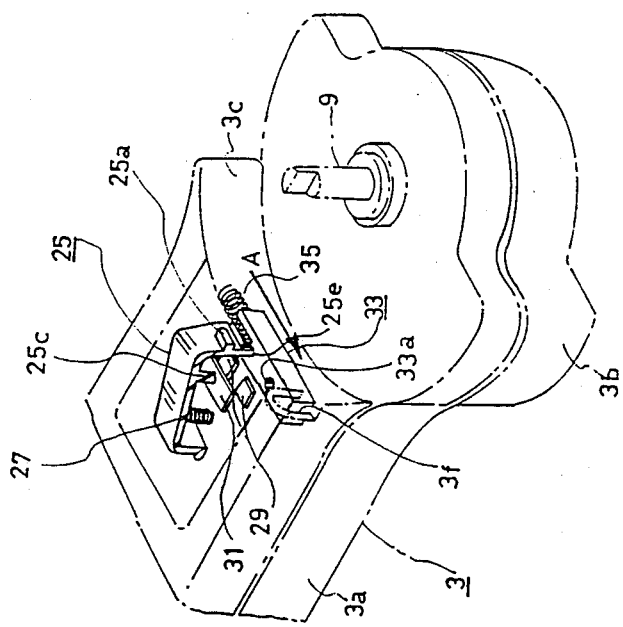
FIG. 4 is an assembled perspective view showing the OFF state of the electric source.
Figure 6:
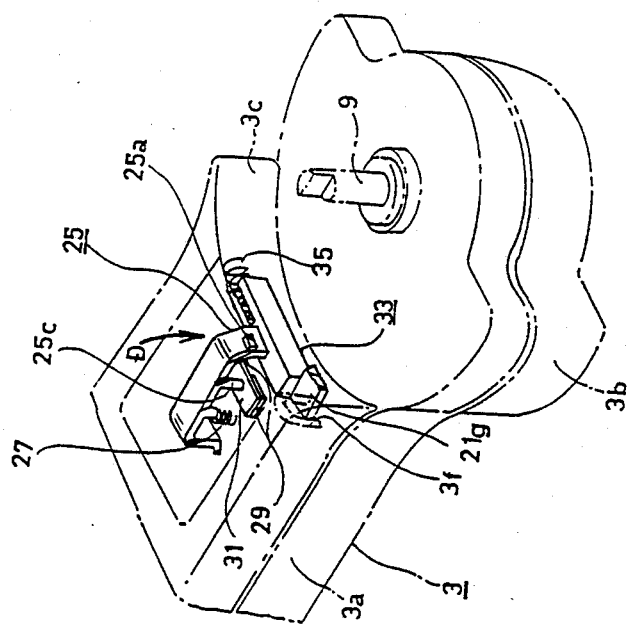
FIG. 6 shows the completed ON state of the electric source.
Figure 5:
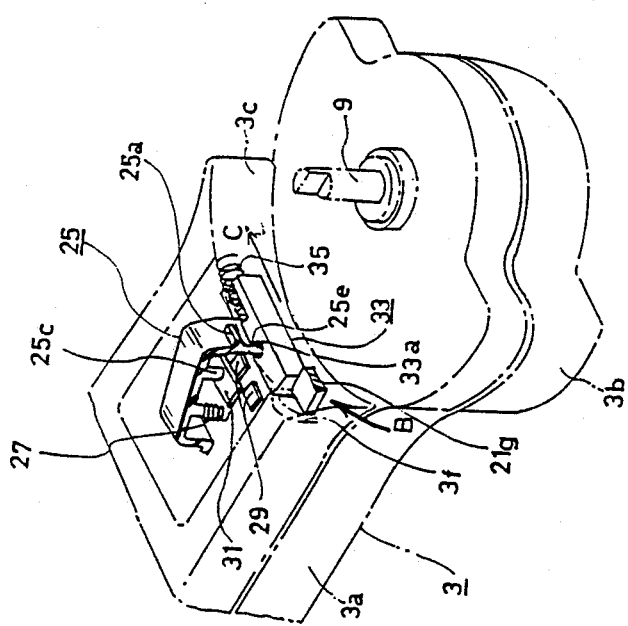
FIG. 5 is the same type of view as FIG. 4 showing an early stage in the ON state of the electric source.
Figure 7:
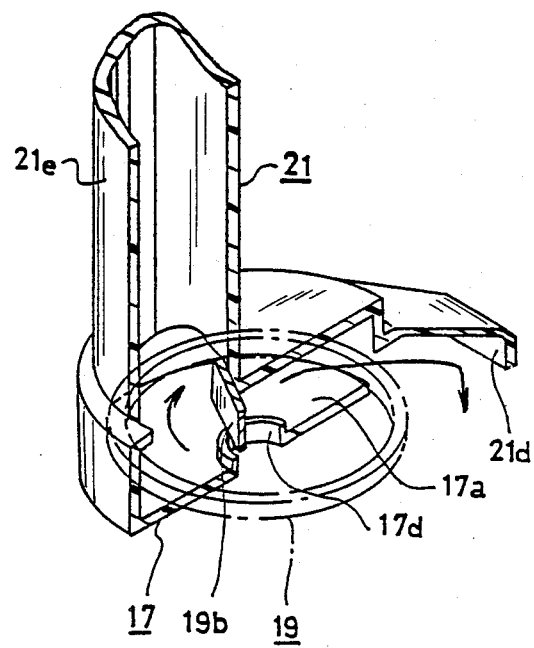
FIG. 7 shows some of the elements of the food processor assembled in the operating condition.

The operation of the electric food processor 1 is now explained, with reference to FIGS. 4 through 7. FIG. 4 shows the OFF state of the electric source, FIG. 5 shows the ON possibility of the electric source without the cover 21 installed, FIG. 6 shows the completed ON state of the electric source after the cover has been installed, and FIG. 7 shows the processing state of the elements.

The bottom plate 17 is engaged with the upper surface of the semicylindrical plate part 3b. The engaging protrusion 17e is engaged with the engaging concave 3d, the driving shaft 9 is inserted through the hole 17d, and the engaging part of 17f is engaged with the engaging protrusion 3d. In addition, the boss 19 of the rotary blade 19 is installed over the upper notched end of the driving shaft 9. The rotary blade 19 is sized such that it is surrounded by the peripheral support wall 17b of the bottom plate 17.

While the protective feed cover 21 has not yet been placed over the plate 21, the regulating member 33 is moved in the direction indicated by arrow A, and its hole 33a is positioned to prevent entry of the axial part 25e into hole 33a, as seen in FIG. 4. When the rotary blade 19 is installed on the driving shaft 9 and the operating lever 25 is pushed to move or pivot down into the handle 3a, the member 33 blocks movement down of the lever 25. This prevents the contact between the electrode plate 31 and the electrodes 29 by regulating the rotation of the lever, despite the fact that the operating lever 25 may be pushed down. This prevents operation of the driving motor.

With the bottom plate 17 and the semicylindrical part 3b as before and where the rotary blade 19 has been provided, if the cover 21 is applied over the plate 17 and if the cover is rotated in the direction indicated by a solid line arrow B in FIG. 5, when the operating piece 21g of the cover moves inside the concave 3f, the parts 21f are engaged with the respective engaging protrusions 17g and the state of their rotation is maintained.

In addition, the regulating member 33 is contacted by the operating piece 21g that is moving in the direction of the solid line arrow B. The member 33 moves in the direction indicated by the solid line arrow mark C in FIG. 5, opposing the bias of the compression spring 35, such that the hole 33a and the axial part 25e may become aligned When the operating lever 25 is now pushed down, entry of the axial part 25e into the hole 33a is permitted. This permits generally downward rotation of the operating lever 25, in the direction indicated by the solid line arrow mark D in FIG. 6, in opposition to the bias of the compression spring 27.

During this rotation of the operating lever 25, the electrode plate 31 contacts the electrodes 29, thereby closing the circuit to the motor. The electric motor 5 is battery operated, and the rotary blade 19 is rotated in the required direction.

When food material to be processed is inserted through the cylindrical part 21e while the rotary blade 19 is turning, the food material is chopped or cut to a required size and shape by the rotary blade 19, the chopped food drops onto the bottom plate 17 and it is guided to the cutout in the wall 17b around the plate by the scraping plate 19b and is then discharged outside through the exit part 21d of the cover.

When food processing has been completed, the cover 21 is dismantled from the bottom plate 17 and the main case or body 3. The body 3 dismantles the rotary blade 19 from the bottom plate 17 and the driving shaft 9, respectively, thereby making it possible for the cover 21, the bottom plate 17 and the rotary blade 19 to be cleaned It is thus possible to clean the device with water, without also having to directly clean the main body 3 in which the electric motor 5 is accommodated.

As described above, the height of the bottom plate 17, which freely accommodates the rotary blade 19, agrees with the height of the blade 19. The food material, which has been fed through the partial cylindrical part 21e of the cover 21 installed on the bottom plate 17, is cut or chopped to a required size and shape by means of the rotating rotary blade 19 and can be discharged outside through the outlet part 21d of the cover 21.

Because of the above arrangement, it is possible to reduce the size of the food processor by shortening the height of the bottom plate 17 and of the feed cover 21 In addition, it becomes possible to dismantle and clean separately the cover 21, the bottom plate 17 and the rotary blade 19, all of which had contacted the food, making it possible to clean the device easily and simply In the above arrangement, an electric switch equipped with a safety mechanism is used to aid in reducing the size of the device However, it is also possible to install a safety switch at a part of the main body 3 in such a manner as to effect ON-OFF operation in conformity with the installation and dismantling of the cover 21, thereby making it possible to carry out food processing by means of a rotary blade 19 that operates by the rotary driving of the electric motor 5 only at the time when the electric source switch is put ON with the safety switch being in the ON state only with the cover installed.

Further, the scraping plate 19b provided on the lower surface of the rotary blade 19 is formed to extend straight and in a radial direction. Nevertheless, it is possible for the scraping plate 19b to have a curved surface or an outer peripheral edge that is rotatably shifted to the back.

As has been described above, the invention processes food material by cutting it into a required size and shape without requiring a storage container or vessel, thereby making it possible for the electric food processor of the invention to be of reduced size.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. An electric food processor comprising:
    a main body; a graspable handle attached to and extending away from the main body for being grasped;
    a blade driving shaft supported in the body for rotation and electric driving means in the body for driving the shaft for rotation; a rotatable blade detachably connected on the driving shaft for being driven to rotate by the driving shaft;
    a detachable bottom plate supported in the body, and the shaft extending through the bottom plate; the bottom plate having a peripheral side wall; a discharge cutout in the peripheral side wall for discharge of processed food off the bottom plate and through the discharge cutout;
    a cover detachably disposed above the bottom plate and defining a food processing chamber together with the bottom plate and in which chamber the rotary blade is accommodated; the height of the peripheral wall of the bottom plate is selected so that the height of the chamber generally approximates the height of the blade, whereby the blade may be accommodated over the bottom plate in the chamber; the cover having a cover discharge opening generally located around the cover in the area of the discharge cutout of the bottom plate peripheral wall for enabling the discharge of processed food;
    a switch connected to the electric driving means for the rotary shaft, the switch being operable between an inoperative position and an operative position for operating the driving means, and means on the switch and on the cover for cooperating to operate the switch to operate the driving means only after the cover has been installed on the bottom plate.

2. The food processor of claim 1, wherein the cover has a feed opening for food material for the feeding in of material to the food processing chamber.

3. The food processor of claim 1, wherein the switch includes a switch lever that is movable toward and away from the main body; electric contacts on the main body, connected with the driving means, such that when the switch lever is pivoted toward the main body, the switch lever engages the contacts for activating the driving means;
    switch lever blocking means disposed on the main body and normally at a first blocking position for blocking the movement of the switch lever to the switch contact engaging position, the blocking means being movable to a second nonblocking position where it permits movement of the switch lever to the contact engaging position; the blocking means being shaped and positioned for being engageable by the cover when the cover is installed on the bottom plate, such that when the cover is installed on the bottom plate, it moves the blocking means to the second position for enabling the switch lever to move to the contact engaging position.

4. The food processor of claim 3, wherein the blocking means comprises a bar, and biasing means for normally biasing the bar to the first position, and the bar being movable to the second position through being engaged by the cover.

5. The food processor of claim 4, wherein the bar is movable laterally over the main body and the switch lever is movable toward and away from the main body, and the bar and switch lever are respectively so shaped that the bar blocks the movement of the switch lever toward the main body until the bar is moved to the second position thereof by the cover.

6. The food processor of claim 1, wherein the plate and the cover together respectively define the chamber to be of a predetermined height and the blade is approximately of the predetermined height in the chamber.

7. The food processor of claim 1, wherein the shaft projects in one direction, and the handle projects from the main body in a direction generally perpendicular to the direction of extension of the shaft.

8. The food processor of claim 1, further comprising pushing means on the blade shaped for pushing processed food on the bottom plate toward and through the discharge cutout in the peripheral wall of the bottom plate and through the cover discharge opening.

9. The food processor of claim 8, wherein the pushing means of the blade comprises a scraper supported on the blade and extending toward the bottom plate.

* * * * *